United States Patent [19]

Stappaerts et al.

[11] Patent Number: 5,221,989
[45] Date of Patent: Jun. 22, 1993

[54] LONGITUDINAL PLZT SPATIAL LIGHT MODULATOR

[75] Inventors: Eddy A. Stappaerts, Rancho Palos Verdes; William H. Steier, San Marino; Gabriel G. Lombardi, Redondo Beach, all of Calif.

[73] Assignee: Northrop Corporation, Hawthorne, Calif.

[21] Appl. No.: 791,804

[22] Filed: Nov. 13, 1991

[51] Int. Cl.⁵ .................. G09G 3/16; G02F 1/28
[52] U.S. Cl. .......................... 359/323; 385/3; 359/258
[58] Field of Search .......... 359/183, 184, 254, 255, 359/258, 267, 279, 323, 260, 261, 317; 385/3; 358/61, 206

[56] References Cited

U.S. PATENT DOCUMENTS

| | | |
|---|---|---|
| 3,183,359 | 5/1965 | White . |
| 3,741,627 | 6/1973 | Haertling et al. . |
| 3,744,875 | 7/1973 | Haertling et al. . |
| 4,410,240 | 10/1983 | Medernach . |
| 4,630,040 | 12/1986 | Haertling . |
| 4,636,786 | 1/1987 | Haertling . |
| 4,751,196 | 6/1988 | Pennell et al. . |
| 4,793,697 | 12/1988 | Wu et al. . |
| 4,861,975 | 8/1989 | Keno et al. ............ 359/323 |
| 5,018,852 | 5/1991 | Cheng et al. ............ 356/28.5 |
| 5,148,335 | 9/1992 | Kudo et al. ............ 369/59 |

FOREIGN PATENT DOCUMENTS

| | | |
|---|---|---|
| 58-46320A | 3/1983 | Japan . |
| 58-130321 | 8/1983 | Japan . |
| 2191596 | 6/1986 | United Kingdom . |

Primary Examiner—Nelson Moskowitz
Attorney, Agent, or Firm—Terry J. Anderson; Robert B. Block; Karl J. Hoch, Jr.

[57] ABSTRACT

A spatial light modulator comprises a plate of non-ferroelectric PLZT ceramic. An array of pixels is formed by depositing a reflecting coating in the desired array on one side of the plate. A longitudinal electric field is applied so that the light entering the plate from the side opposite the reflecting coating experiences a polarization-independent refractive index change when the electric field is applied as it propagates parallel to the electric field. The required voltages may be decreased when a partially reflecting coating is deposited on the side opposite the reflecting coating. Grooves in the plate effectively isolate the pixels from electrical and mechanical crosstalk.

11 Claims, 2 Drawing Sheets

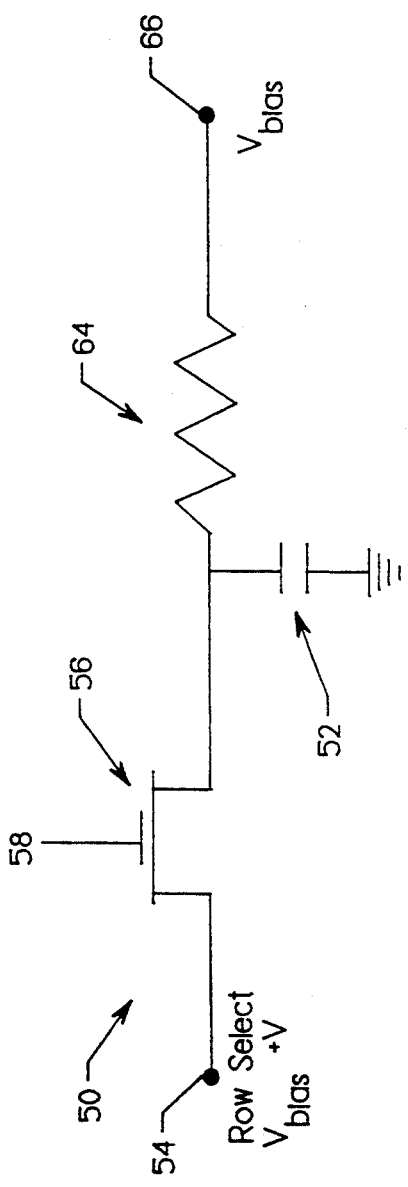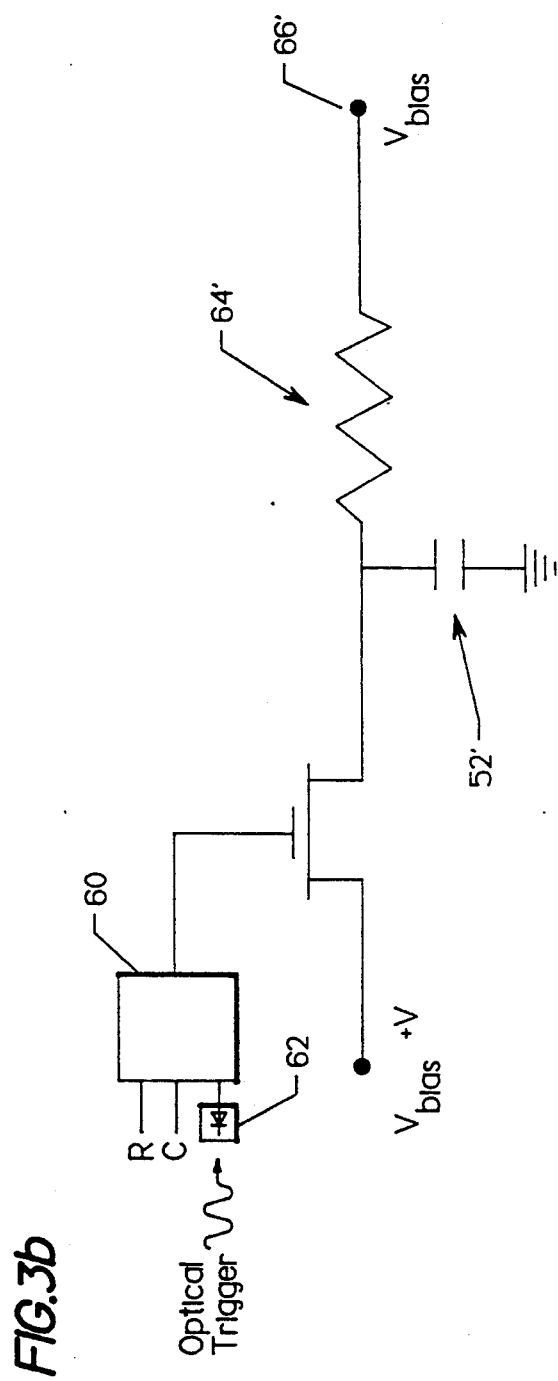

LONGITUDINAL PLZT SPATIAL LIGHT MODULATOR

FIELD OF THE INVENTION

The invention relates to electrically-addressed spatial light modulators (SLMs) which have a number of important applications e.g. in optical signal processing and real-time holography, and more particularly to a new SLM phase modulation device utilizing a non-ferroelectric PLZT ceramic.

BACKGROUND OF THE INVENTION

Existing SLM devices use a number of different designs including multiple-quantum-well structures, liquid crystals, deformable mirrors, pockels-type electro-optic arrays such as the known PROM device, e-beam DKDP light valves and Kerr-type electro-optic arrays such as transverse PLZT arrays. However, it will be appreciated that some applications of these devices have simultaneous requirements on wavelength coverage, fill-factor, refresh-rate, and damage optical fluence, which are not met by any of the existing devices. Also, most existing SLMs are quite expensive, which prevents wide-spread application.

PLZT material is a ceramic which is very attractive for large arrays because the material is rugged, easy to fabricate in large pieces, and because several machining/fabrication techniques are available.

A transverse electro-optic effect in perovskite-like ceramics such as PLZT and PZT is well known. U.S. Pat. No. 4,636,786, issued Jan. 13, 1987, entitled "Electrooptic Ceramic Display and Method for Making Same" to Haertling describes a device using a transverse electric field in a ferroelectric PLZT ceramic.

With the known transverse electro-optic effect, the electric field and light propagation direction are orthogonal. In contrast, a longitudinal effect means that the electric field lines due to the applied voltage are parallel to the propagation direction of the light beam.

The transverse field in these materials creates a birefringence which can be used to produce an amplitude or phase modulator. The birefringence can either be linear (Pockels-effect) or quadratic (Kerr effect) with the applied electric field.

U.S. Pat. No. 3,741,627, issued Jun. 26, 1973, entitled "Strain Biased Ferroelectric Electro-Optics" Haertling et al. contemplates a longitudinal effect in a ferroelectric PLZT ceramic, but requires that a strain be introduced by the mechanical mounting of the ceramic in a stressed condition.

U.S. Pat. No. 3,744,875, issued Jul. 10, 1973, entitled "Ferroelectric Electrooptic Devices" Haertling et al. describes a longitudinal device which make use of the scatter of light from the ceramic under a longitudinal field to amplitude modulate the amount of light transmitted by the ceramic.

In Japanese Patent No. 58-130321 (A) issued Aug. 3, 1983, entitled "Optical Switching Array Element", there is described an array in which grooves are used to prevent light scattered from one element being transmitted to an adjacent element to prevent optical crosstalk between the elements of the array.

The major drawbacks of the transverse design are the limited interaction length due to the limited penetration of the fringing electric fields (typically 50 micrometers), and the reduced filling factor.

For applications such as holographic phase conjugation, phase modulators are superior to amplitude modulators because of their much higher diffraction efficiency.

SUMMARY OF THE INVENTION

It is therefore an object of the invention to provide a longitudinal phase modulation SLM which is more easily fabricated and which allows a greater fill factor than previously obtained and which offers the possibility of doing so at a lower cost.

The foregoing and other problems are overcome and the objects of the invention are realized by a phase modulator array based on a newly discovered longitudinal electrooptic effect in non-ferroelectric polycrystalline ceramic PLZT $(Pb_{1-3x/2}La_x(Zr_yTi_{1-y})_{1-x}O_3$. It has the potential for wide spectral coverage, from 0.5 $\mu$m in the visible to 5.8 $\mu$m in the infrared; excellent area fill factors over 90 percent; high refresh rates on the order of 100 $\mu$sec for a 128×128 array; and a high damage fluence on the order of 1J/cm$^2$, which makes it suitable for use with pulsed lasers. It allows the fabrication of a high density SLM with more ease than has heretofore been the case, especially in the infrared region of the spectrum.

In accordance with the invention there is provided apparatus for phase modulation of light comprising a plate of non-ferroelectric ceramic PLZT, the plate having parallel sides, a reflective conductive coating on one of said parallel sides of the plate, a conductive coating on the opposite side, the conductive coating allowing the passage of light through the plate, a terminal connected to the plate for applying an electrical field to the PLZT plate in a direction substantially orthogonal to the sides of the plate whereby, while the electric field is applied, a polarization-independent refractive index change in the PLZT ceramic plate is experienced by the light propagating parallel to the electric field.

In a further embodiment in accordance with the invention, the conductive coating is at least partially reflective so as to form a resonant optical structure.

In another embodiment of the invention, each pixel of the SLM is defined by the laying down of a reflective array pattern and may be isolated by grooves in the PLZT plate.

BRIEF DESCRIPTION OF THE DRAWING

The above set forth and other features of the invention are made more apparent in the ensuing Detailed Description of the Invention when read in conjunction with the attached Drawing, wherein:

FIG. 3a and 3b show examples of pixel electrical switching configurations useful with the array in accordance with the invention.

DETAILED DESCRIPTION OF THE INVENTION

Figure 1:
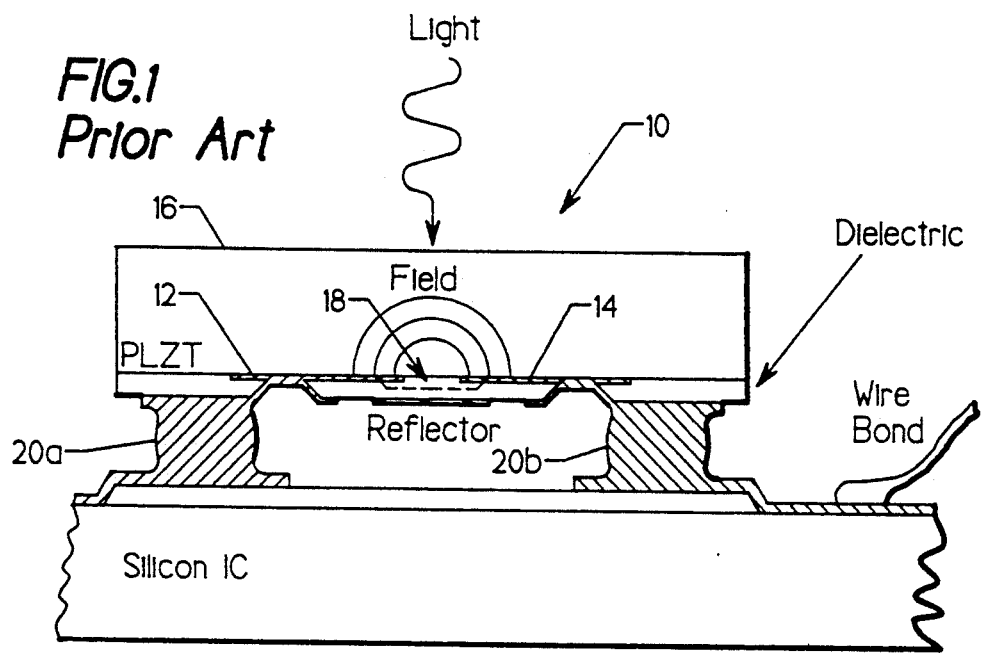
FIG. 1 is a prior art device of the transverse type.

As mentioned previously, examples of transverse SLMs using ceramic PLZT have been reported. A 64-element PLZT-silicon SLM has been fabricated by Plessey Corporation. A schematic representation of the operational elements of a pixel of the device is shown in FIG. 1 at 10. In this device, the two illustrated electrodes 12 and 14 are on the same side of the PLZT plate 16, and therefore a transverse field orthogonal to the light propagation direction is created inside the material at gap 18 between the electrodes. Flip chip solder bonds, illustrated at 20a and 20b were used to contact the pixels to the electronics.

Figure 2:
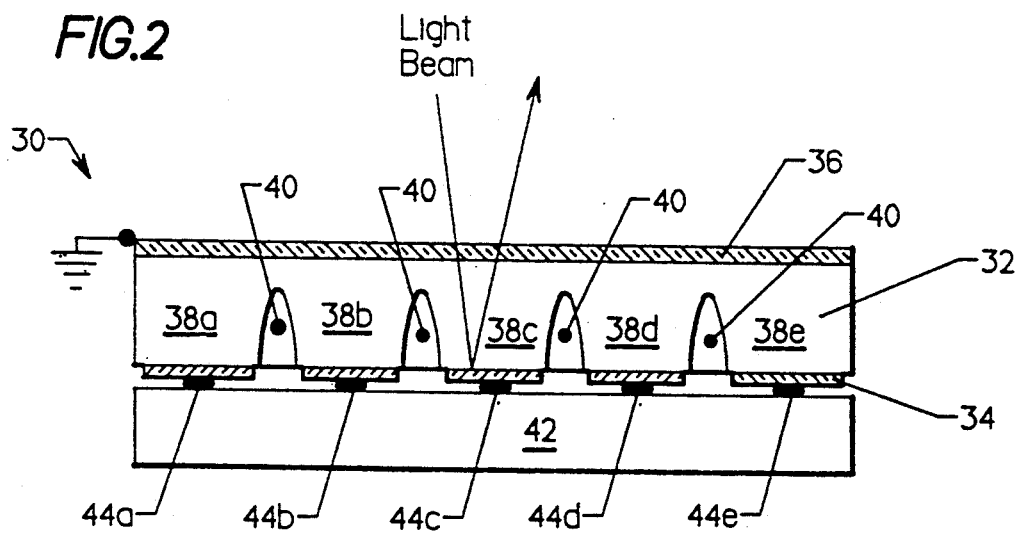
FIG. 2 is a schematic drawing of a phase-modulated longitudinal PLZT SLM in accordance with the invention.

A schematic of a longitudinal PLZT SLM in accordance with the invention is shown at 30 in FIG. 2. A non-ferroelectric PLZT plate 32 having a typical thickness of several 100 micrometers has a highly reflective coating on one surface 34 (shown here at the bottom), and an anti-reflection or partially reflective coating on the other surface 36 (shown here as the top). The coating on surface 34 is preferably deposited in the form of an array which defines a plurality of pixels 38a, 38b, 38c, etc. It will be appreciated that in this illustrated arrangement the coatings 34 and 36 must have sufficient electrical conductivity to charge the pixels. In a preferred embodiment, grooves 40 are machined into the PLZT plate 32 in order to mechanically and electrically isolate the pixels.

An electric field is created between coating 36 and the coating or array 34, suitably by representative electronic driver circuitry 42, shown in block diagram and discussed in conjunction with FIGS. 3a and 3b, is preferably fabricated on a separate silicon wafer which can be contacted to the SLM pixels using, for example and not as a limitation, flip chip solder bonds (44a, 44b, 44c, etc.) as also illustrated in FIG. 1. As discussed below, in accordance with the invention, a light beam, shown here incident from the top is phase-modulated during the double pass through the non-ferroelectric PLZT material.

A longitudinal electro-optic effect in non-ferroelectric PLZT was discovered and has been used to produce phase modulation. The effect creates a polarization-independent refractive index change which is seen by an optical beam propagating parallel to the applied electric field. The effect can be linear (Pockels) or quadratic (Kerr) with the applied field, i.e.

$$\delta(n_o - n_e) = n^3 r_L E \text{(Pockels)},$$

or $$\delta(n_o - n_e) = n^3 R_L E^2 \text{(Kerr)}.$$

In both the transverse and longitudinal case the Kerr effect can be used with a large DC bias voltage to give an enhanced electro-optic effect which reduces the required modulation voltage. These materials are also either piezoelectric, in which case the induced strain varies linearly with the applied field, or electrostrictive, in which case the dependence is quadratic, i.e.:

$$S = d\, E \text{ (piezoelectric)}$$

or $$S = M\, E^2 \text{ (electrostrictive)}$$

In general, the ferroelectric phases of these materials are piezoelectric and show the Pockels effect, and the non-ferroelectric phases are electrostrictive and show the Kerr effect.

PZT ($Pb(Zr_xTi_{1-x})O_3$) in the usual 65/35 composition is ferroelectric and thus piezoelectric and Pockels. PLZT can be ferroelectric or not depending on the lanthanum concentration. For lanthanum concentrations in the 9–10 percent range in 65/35 material, the material is typically non-ferroelectric. The PLZT ceramics exhibit the largest electro-optic effect and are therefore preferred; because of the Kerr effect a bias voltage can be used to minimize the modulation voltage. Some selected physical parameters of a non-ferroelectric PLZT material are listed in Table 1.

TABLE 1

| Selected Parameters of Non-Ferroelectric PLZT Ceramic | |
|---|---|
| Index of Refraction | 2.5 |
| Dielectric Constant | 5700 |
| Thermal Expansion | $5.4 \times 10^{-8}$/C |
| Curie Point | 85 C |
| Electrical Resistivity | $10^{13}$ Ohm-cm |

The grain size of the polycrystalline ceramics is on the order of 2 μm. The crystallites within the ceramic are assumed to be of the tetragonal (4 mm) system which has a weak Pockels and a larger Kerr-type electronic electrooptical effect. The Kerr effect in a single crystal produces a refractive index change for a longitudinal configuration given by:

$$\delta n = \tfrac{1}{2} n^3 R_{11} E^2$$

and, for a transverse configuration:

$$\delta n = \tfrac{1}{2} n^3 R_{12} E^2$$

For PLZT, and $R_{11} = R_{22} = R_{33}$ and $R_{12} = 0.1 \times R_{11}$. An estimate of the effective longitudinal Kerr coefficient was derived from published data on the effective birefringence of the poled ceramic material. Baerwald calculates that if all domains of the polycrystalline ceramic material align as close as possible to the ceramic polar axis, the ceramic birefringence would be 0.64 of the crystalline birefringence. See Baerwald, Thermodynamic Theory of Ferroelectric Ceramics, Phys. Rev., Vol. 105, Jan. 1957, p.480. From this, the average angle between the ceramic polar axis and the domain optic axis can be calculated to be about 37 degrees. Using this value, the longitudinal (Kerr) refractive index change can be related to the transverse (Kerr) birefringence, $R_t$, which has been measured for PLZT as $3.8 \times 10^{-16}$ m/V. The longitudinal coefficient, $R_L$, calculated from this simple theory, is $3.2 \times 10^{-16}$ m/V, which is of the same order as the transverse effect coefficient.

Preliminary experimental measurements were made of the longitudinal Kerr effect in PLZT. Plates of non-ferroelectric PLZT material 0.3 mm thick were obtained from Motorola (composition 9565, with 9.5% lanthanum). A transparent tin-oxide coating was deposited on one side, and a gold electrode on the opposite face. The refractive index changes were measured in an interferometer at the He-Ne laser wavelength of 0.63 micrometers. DC and pulsed voltages were applied across the plate. The longitudinal effect was clearly observed, and Kerr coefficient close to the predicted value obtained. The electrostrictive effect was also clearly observed, but no attempt was made to measure the coefficient or to accurately separate the mechanical (electrostrictive) and electrooptic (Kerr) effects.

Pulsed measurements were also made with pulse risetimes less than 1 μsec. The observed response clearly demonstrated that the speed of the effect is sufficient for the spatial light modulator in accordance with the invention.

At a bias voltage of 550 V, a 20 V modulation voltage was sufficient to produce a $\pi/2$ phase shift for two passes through the material. Extrapolating this measurement to a wavelength of 2 $\mu$m, a $\pi/2$ phase shift would require a modulation voltage of approximately 60 V. Thus PLZT phase modulation SLMs requiring a phase modulation of $\pm\pi/2$ will require electronic drivers supplying voltages in the 100 V range to cover the 2.0 to 5.0 $\mu$m band.

Typical design goals for an SLM array in accordance with the invention are (1) array sizes of 128 $\times$ 128 pixels, (2) area filling factors greater than 90%, (3) phase shifts up to $\pi/2$ (4) array refresh times down to 100 $\mu$sec, (5) drive voltages not exceeding 100 V, and (6) pixel crosstalk consistent with system noise requirements. All of these requirements interact to produce tradeoffs in the design of the array in accordance with the invention. For example, electrical/mechanical crosstalk limits determine how much grooving is necessary, and this along with the fill-factor requirements determines pixel size. The PLZT plate thickness is determined by electric breakdown properties and fabrication and mounting techniques. The pixel area and thickness in turn determine the pixel capacitance and therefore the switching energy and electronic driver current. These factors will be briefly reviewed below in order to describe the parameters of a practical longitudinal PLZT SLM.

The pixel capacitance, C, is given by $C = \epsilon A/L$ where A is the pixel area, L the pixel thickness, and $\epsilon$ the PLZT dielectric constant. The current, I, required to charge the pixel to a voltage, V, in a time, t, is $I = CV/t$. The charging energy per pixel, E, is $E = CV^2$. As an example, for $A = 1$ mm$^2$, $1 = 0.3$ mm, $\epsilon = 5300$, $t = 100$ $\mu$sec and $V = 100$ V, the current is $I = 15.5$ mA and the pixel switching energy is $E = 1.5$ $\mu$J. For a 128 $\times$ 128 array, with simultaneous (parallel) charging of all 128 rows, a pixel switching time of 1 $\mu$sec would result in an array refresh time of 128 $\mu$sec, or 64 $\mu$sec if double-sided charging is used (i.e. half the elements are charged by drivers on one side of the array, and half by drivers on the other side). These required voltages, currents and switching speeds are attainable using commercially available electronics such as the Texas Instruments SN5500E AC plasma display drivers.

Crosstalk between pixels must be minimized. Crosstalk has both electrical and mechanical contributions. Electrical crosstalk is created by fringing fields between pixels. Mechanical crosstalk is caused by deformation of the ceramic due to electro-striction and heating. It has been found that both types of crosstalk can to some extent be controlled by grooving, but the grooves have a detrimental effect on fill-factor. The high dielectric constant of PLZT, $\epsilon = 5300$, will greatly reduce electric crosstalk. The mechanical crosstalk depends on the mounting of the PLZT plate and any mechanical constraints as may be caused e.g. by electrical connections.

Pixel isolation grooves may be cut using micro-saws, or they may be laser-etched using visible or ultraviolet lasers in a controlled atmosphere. Using a XeCl laser, grooves 50 to 300 $\mu$m wide have been cut in PZT, as described by Eyett, Excimer-Laser-Induced Etching of Ceramic PbTi$_{1-x}$Zr$_x$O$_3$, J. Appl. Phys. 62, 15 Aug. 1987, p. 1511. An excimer laser technique which should be used to create conducting electrodes on PLZT has also been reported by Kapenieks, Laser-Induced Metallization of Ceramic PLZT, Appl. Phys. A, Vol. 41, p. 331.

For square pixels of width, w, and grooves with width, $\delta$w, between pixels, the area fill factor is $1 - 2\delta w/w$. For a 50 $\mu$m groove width, a 90% fill factor would require $w = 1$ mm.

Two examples of pixel electrical switching configurations are shown in FIGS. 3a and 3b. In FIG. 3a, in the configuration shown at 50, all pixels, one of which is shown at 52, in a selected rows are updated simultaneously, for example, and rows are updated sequentially. When the row-select input at 54 is high, the MOSFET 56 can switch the column input at 58 to the pixel 52.

Alternatively, as illustrated in FIG. 3b, low-voltage on/off signals are initially sent at high clock speed to low-voltage logic circuits, a representative one of which is shown at 60, each respectively associated with each pixel of the array, a representative one being shown at 52', where the information is latched; charging of the selected pixels is then initiated, preferably by a light pulse which illuminates an optical trigger input 62 of all logic elements simultaneously. In both FIGS. 3a and 3b, a fixed voltage bias preferably is maintained on all pixels 52, 52' through a high resistance 64, 64' connected to a voltage input at 66, 66'.

For a Kerr-type electrooptical effect, the required pixel switching voltage increases as the square root of the wavelength. Lower modulation voltages would have benefits such as simplifying the electronics and reducing electrical surface tracking problems between pixels, thereby allowing reduced groove widths. It has been found that it is possible to reduce the required voltage by making the coating 36 in FIG. 2 partially reflective (as compared to anti-reflective), thus producing a resonant optical structure. It is known that, for a coating with reflectivity R, and for a modulator single-pass phase shift, $\Phi$, the phase shift imposed on the output beam is given by:

$$\Phi_{tot} = 2(r+1)/r-1)$$

with $r = \sqrt{R}$

As an example, for $R = 0.3$, the required voltage is reduced by a factor of approximately 3.

While the invention has been particularly shown and described with respect to a preferred embodiment thereof, it will be understood by those skilled in the art that changes in form and details may be made therein without departing from the scope and spirit of the invention.

What is claimed is:

1. Apparatus for phase modulation of light comprising;

a plate of non-ferroelectric ceramic PLZT, said plate having first and second spaced, generally parallel sides, a conductive, light transmissive coating formed on said first side, a conductive, light reflective coating formed on said second side, said transmissive conductive coating admitting light into the plate from a direction normal to said first side, said light traversing said plate to said second side from which it is reflected back by said reflective conductive coating to exit the plate through said transmissive conductive coating at the first side, electrical means connected to the coatings for developing an electric field in the PLZT plate in a direction substantially orthogonal to the sides of the plate and generally in longitudinal alignment with light propagating between said sides to cause a polarization-independent refractive index change in the PLZT ceramic plate which index change causes a phase shift to said propagating light in response to said applied electric field.

2. The apparatus of claim 1 wherein said reflective coating is deposited in the form of an array defining a plurality of pixels.

3. The apparatus of claim 2 wherein the pixels are isolated by means of grooves in the plate.

4. The apparatus of claim 1 wherein the non-ferroelectric PLZT is selected from those PLZT ceramics having a Lanthanum concentration range of between about 9% to about 10%.

5. The apparatus of claim 1 wherein said transmissive, light conductive coating includes an anti-reflection coating.

6. The apparatus of claim 1 wherein the conductive coating is a partially reflecting coating.

7. Spatial light modulator apparatus for phase modulation comprising, a plate of non-ferroelectric ceramic PLZT, said plate having parallel sides, a highly reflective coating deposited in an array defining a plurality of pixels on one of said sides, a conductive coating on the opposite side, said conductive coating allowing the passage of light through the plate from that side to be reflected from said pixels to exit the first side, means connected to the pixels for selectively applying an electrical field to the PLZT plate in a direction substantially orthogonal to the sides of the plate to cause a polarization-independent refractive index change for light propagating parallel to the electric field when the field is applied to the pixel.

8. The apparatus of claim 7 wherein the pixels are isolated by means of grooves in the plate.

9. The apparatus of claim 7 wherein the non-ferroelectric PLZT is selected from those PLZT ceramics having a Lanthanum concentration range of between about 9% to about 10%.

10. The apparatus of claim 7 wherein said conductive coating is an anti-reflection coating.

11. The apparatus of claim 7 wherein the conductive coating is a partially reflecting coating.

* * * * *